US010339384B2

(12) United States Patent
Lorenzo

(10) Patent No.: US 10,339,384 B2
(45) Date of Patent: Jul. 2, 2019

(54) CONSTRUCTION PHOTOGRAPH INTEGRATION WITH 3D MODEL IMAGES

(71) Applicant: Structionsite Inc., San Francisco, CA (US)

(72) Inventor: Philip Garcia Lorenzo, Sacramento, CA (US)

(*) Notice: Subject to any disclaimer, the term of this patent is extended or adjusted under 35 U.S.C. 154(b) by 0 days.

(21) Appl. No.: 16/258,585

(22) Filed: Jan. 26, 2019

(65) Prior Publication Data
US 2019/0156120 A1  May 23, 2019

Related U.S. Application Data

(60) Provisional application No. 62/627,450, filed on Feb. 7, 2018.

(51) Int. Cl.
G06F 3/0481 (2013.01)
G06K 9/00 (2006.01)
G06T 3/40 (2006.01)
G06T 7/73 (2017.01)
G06T 17/00 (2006.01)

(52) U.S. Cl.
CPC ..... *G06K 9/00671* (2013.01); *G06F 3/04815* (2013.01); *G06T 3/4038* (2013.01); *G06T 7/74* (2017.01); *G06T 17/00* (2013.01); *G06T 2210/04* (2013.01)

(58) Field of Classification Search
CPC .................................................. G06T 17/00
See application file for complete search history.

(56) References Cited

U.S. PATENT DOCUMENTS

| 7,852,369 | B2 | 12/2010 | Cutler et al. |
| 8,635,104 | B2 | 1/2014 | Adams |
| 8,705,892 | B2 | 4/2014 | Aguilera et al. |
| 8,818,768 | B1* | 8/2014 | Fan ..................... G06F 17/5004 345/419 |
| 8,866,913 | B1 | 10/2014 | Hsieh et al. |
| 8,893,026 | B2 | 11/2014 | Lindemann et al. |
| 9,207,518 | B2 | 12/2015 | Mueller et al. |
| 9,222,771 | B2 | 12/2015 | Rosengaus et al. |
| 9,239,892 | B2 | 1/2016 | Schmidt et al. |
| 9,311,397 | B2 | 4/2016 | Meadow et al. |
| 9,324,190 | B2 | 4/2016 | Bell et al. |
| 9,324,911 | B2 | 5/2016 | Sheridan et al. |

(Continued)

FOREIGN PATENT DOCUMENTS

| WO | WO2004109385 | 12/2004 |
| WO | WO2017201092 | 11/2017 |
| WO | WO2018055459 | 3/2018 |

*Primary Examiner* — Nay A Maung
*Assistant Examiner* — Jose Torres
(74) *Attorney, Agent, or Firm* — Thomas J. Lavan

(57) ABSTRACT

A method is provided. The method includes one or more of receiving, by an image processing device, one or more photos of building locations at a building, extracting position coordinates comprising X and Y values in a 2D floor plan from the one or more photos, converting the position coordinates into 3D model coordinates, extracting model viewpoints from a 3D model of the building at the 3D model coordinates, and comparing each of the one or more photos with a corresponding model viewpoint. Each of the model viewpoints provides a view of the 3D model at a same viewing position as one of the one or more photos.

17 Claims, 13 Drawing Sheets

(56) References Cited

U.S. PATENT DOCUMENTS

| | | |
|---|---|---|
| 9,330,501 B2 | 5/2016 | Sahoo et al. |
| 9,420,176 B2 | 8/2016 | Hsieh et al. |
| 9,438,800 B1 | 9/2016 | Kozko |
| 9,501,700 B2 | 11/2016 | Loveland et al. |
| 9,536,148 B2 | 1/2017 | Gross |
| 9,648,234 B2 | 5/2017 | Hsieh et al. |
| 9,742,996 B1 | 8/2017 | Martin et al. |
| 2004/0001091 A1 | 1/2004 | Kressin |
| 2010/0231687 A1 | 9/2010 | Amory et al. |
| 2014/0125768 A1* | 5/2014 | Bell .................. G06T 19/20 348/46 |
| 2014/0152651 A1 | 6/2014 | Chen et al. |
| 2014/0279247 A1 | 9/2014 | Leuer et al. |
| 2015/0310135 A1* | 10/2015 | Forsyth ............. G06F 17/5004 703/1 |
| 2015/0310669 A1 | 10/2015 | Kamat et al. |
| 2016/0012160 A1* | 1/2016 | Mohacsi ........... G06F 17/5004 703/1 |
| 2016/0042568 A1 | 2/2016 | Farnham et al. |
| 2016/0117785 A1 | 4/2016 | Lerick et al. |
| 2016/0146604 A1 | 5/2016 | Metzler et al. |
| 2017/0028564 A1 | 2/2017 | Lowy |
| 2017/0032581 A1* | 2/2017 | Petrucci .............. G06T 11/203 |
| 2017/0034112 A1 | 2/2017 | Perlegos |
| 2017/0280114 A1* | 9/2017 | Samuelson ......... G06T 3/0068 |
| 2017/0330398 A1 | 11/2017 | Jordan et al. |

* cited by examiner

Fig. 1 Building Location Image Capture System
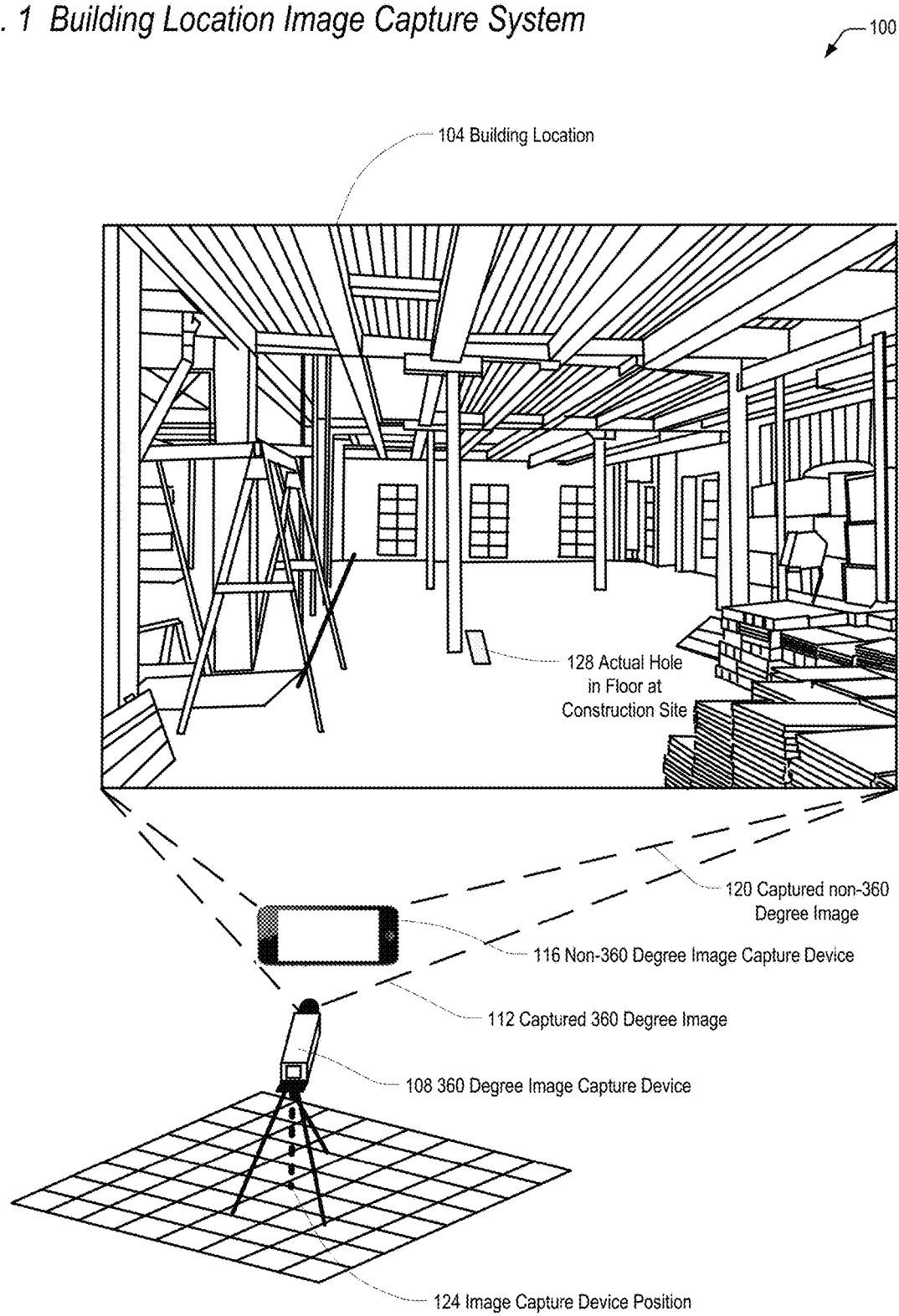

Fig. 2 Camera View Orientation
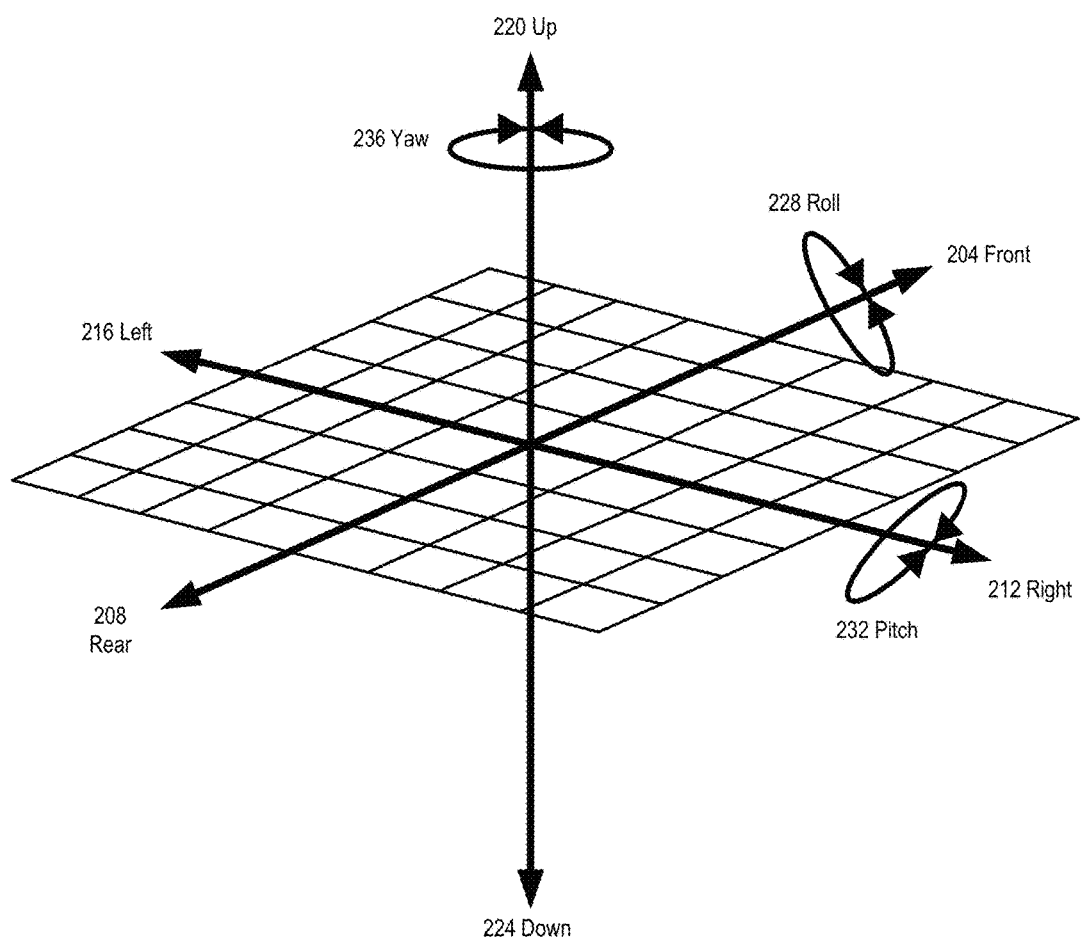

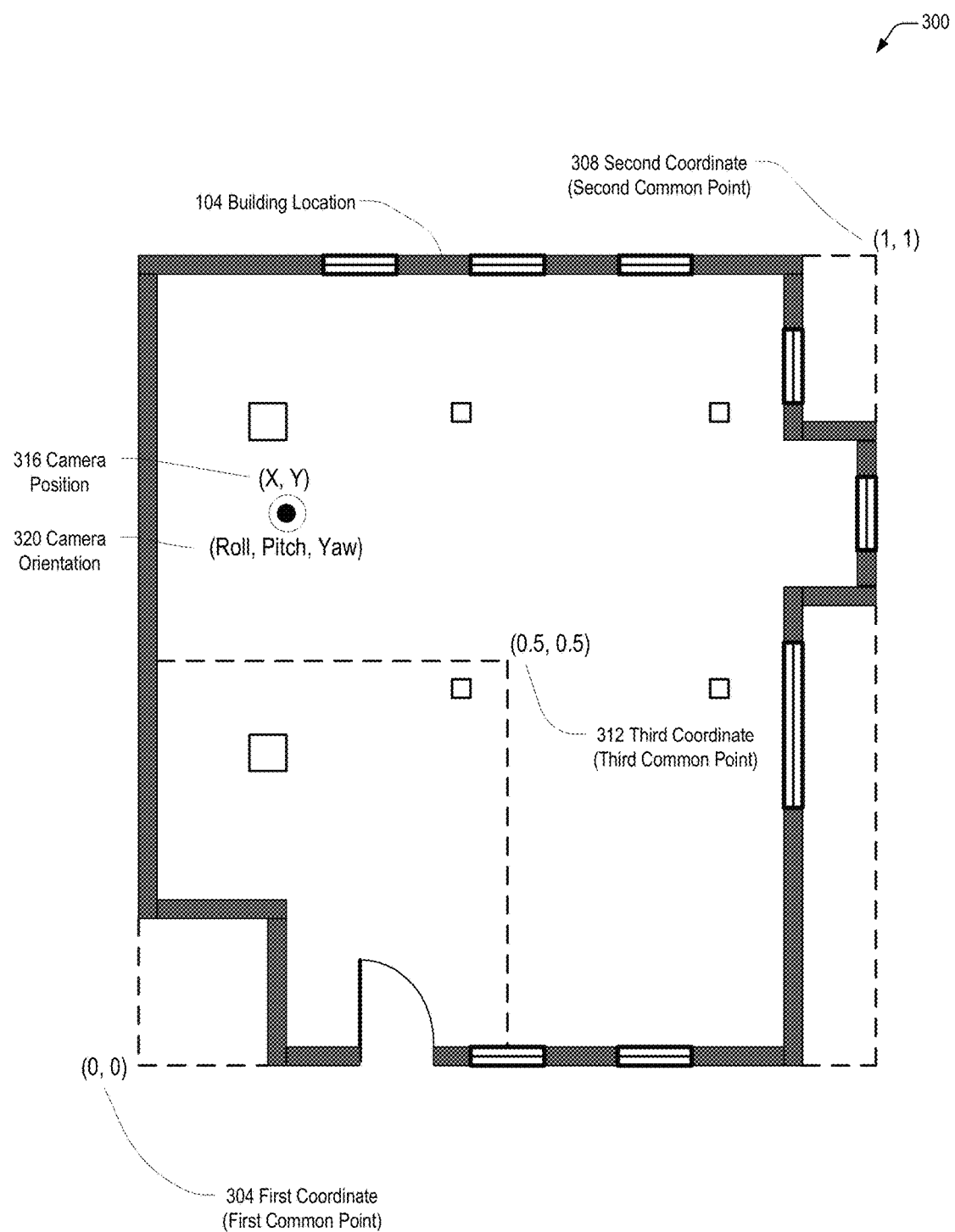

*Fig. 4 Building 3D Model with Self-Contained Coordinate System*
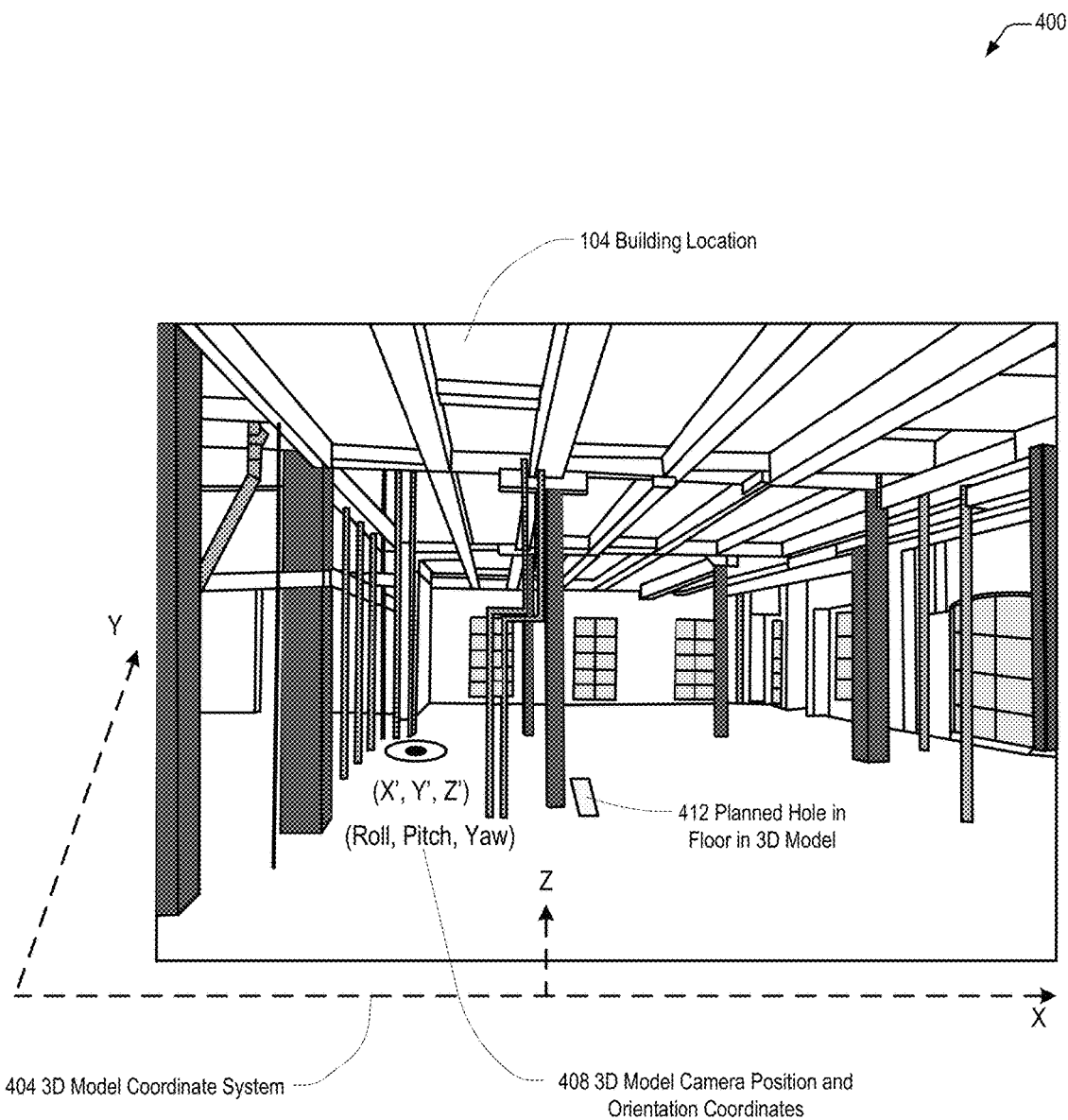

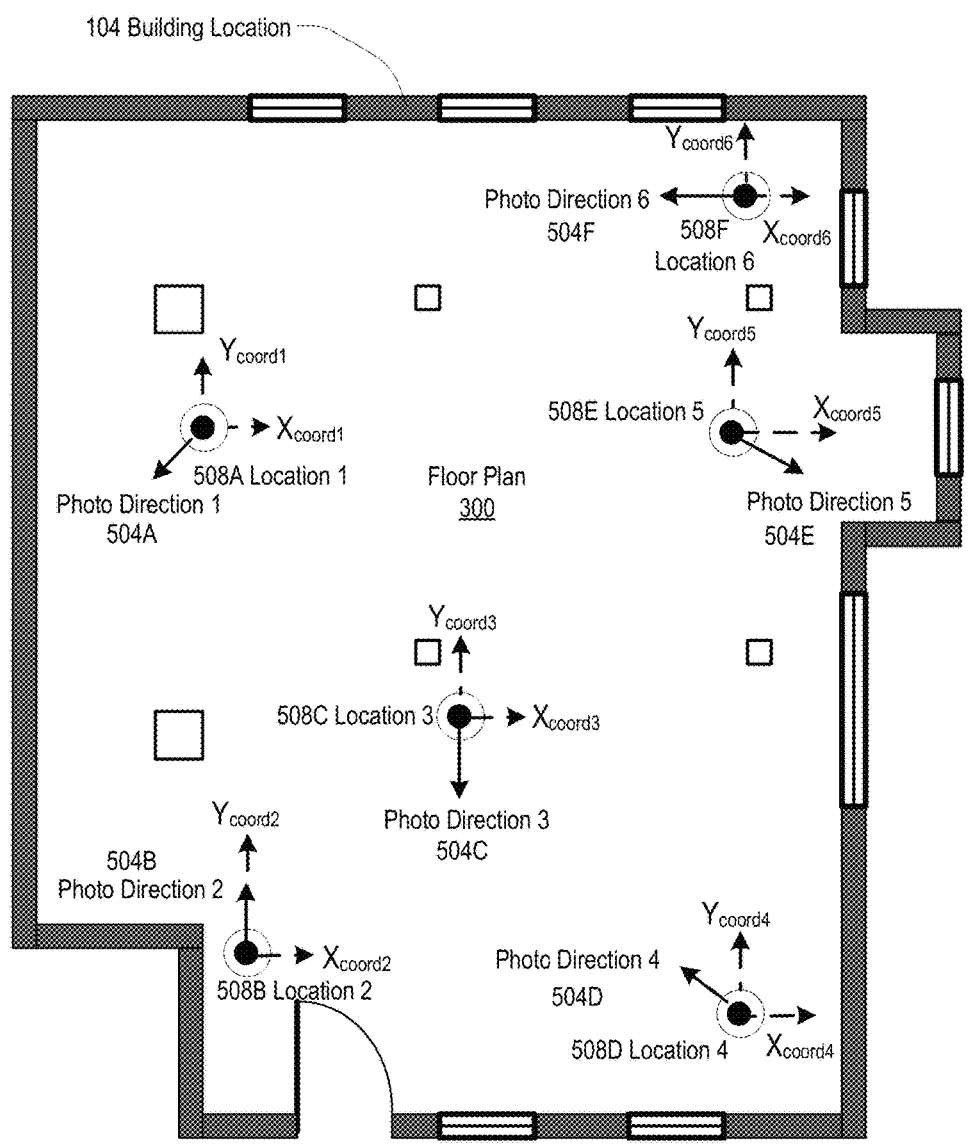
Fig. 5 Photo Locations on 2D Floor Plan

Fig. 6 Image Processing Device Block Diagram
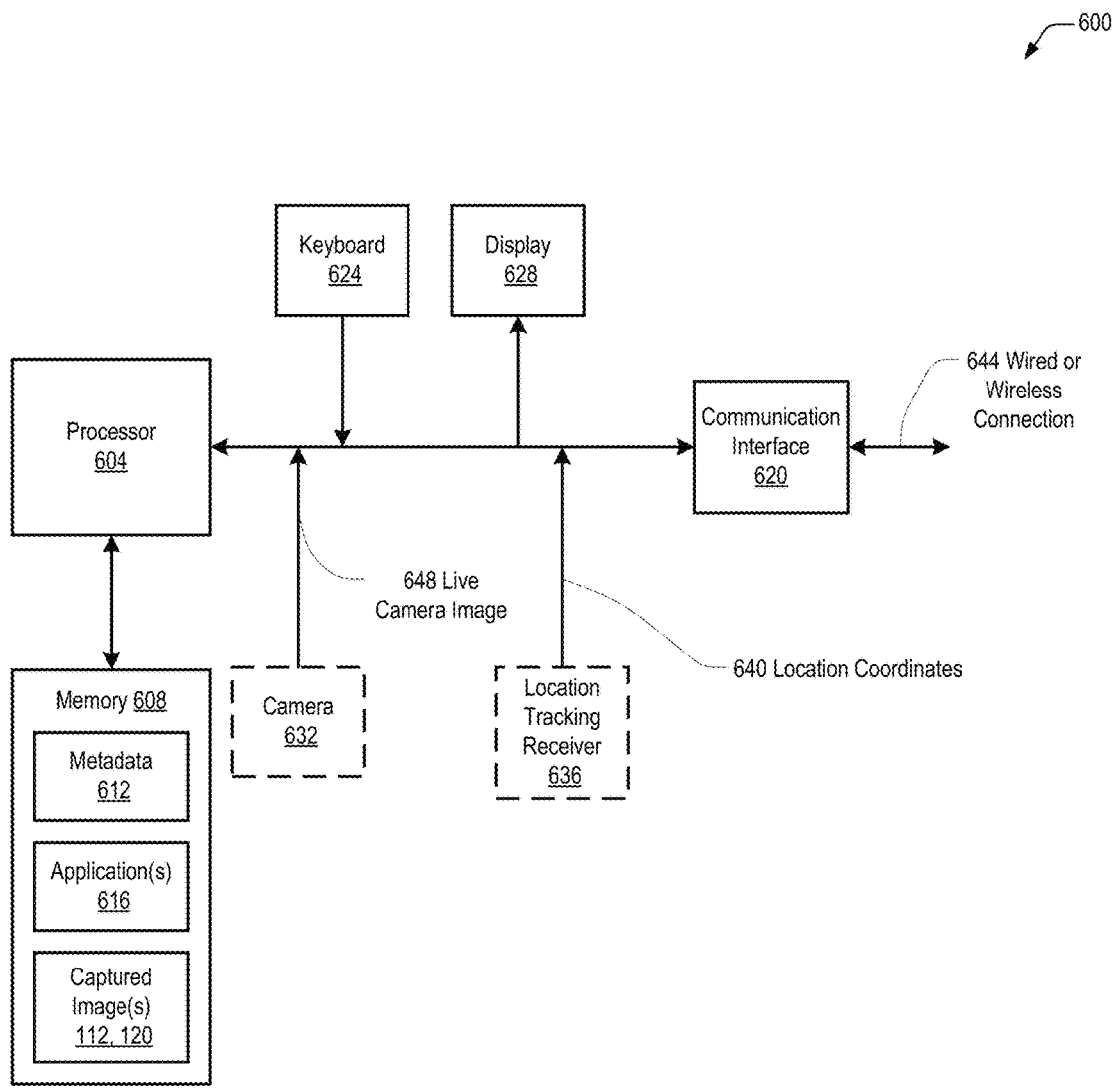

Fig. 7 Non-Panoramic Image Transfer Flow Diagram
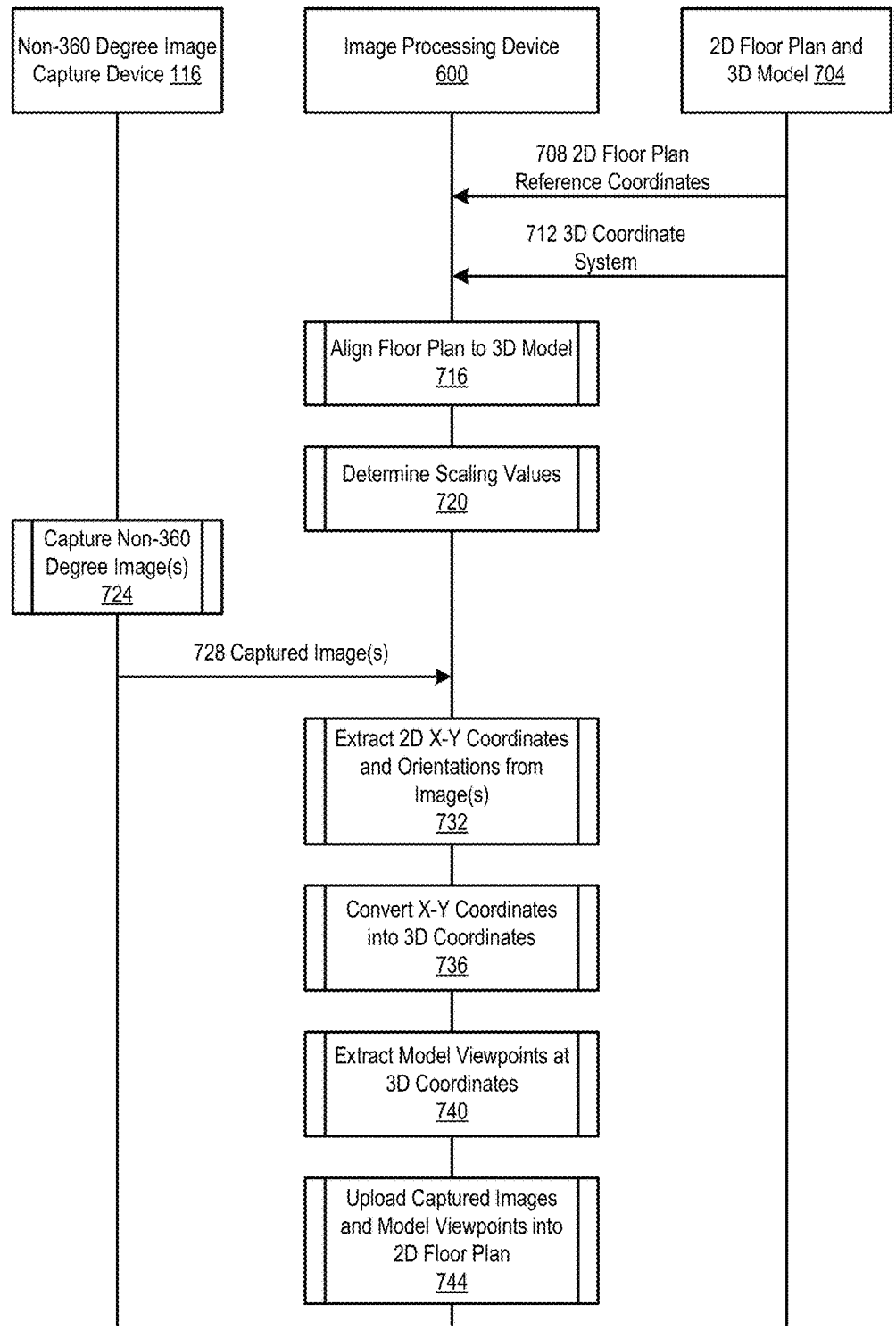

Fig. 8 Panoramic Image Transfer Flow Diagram
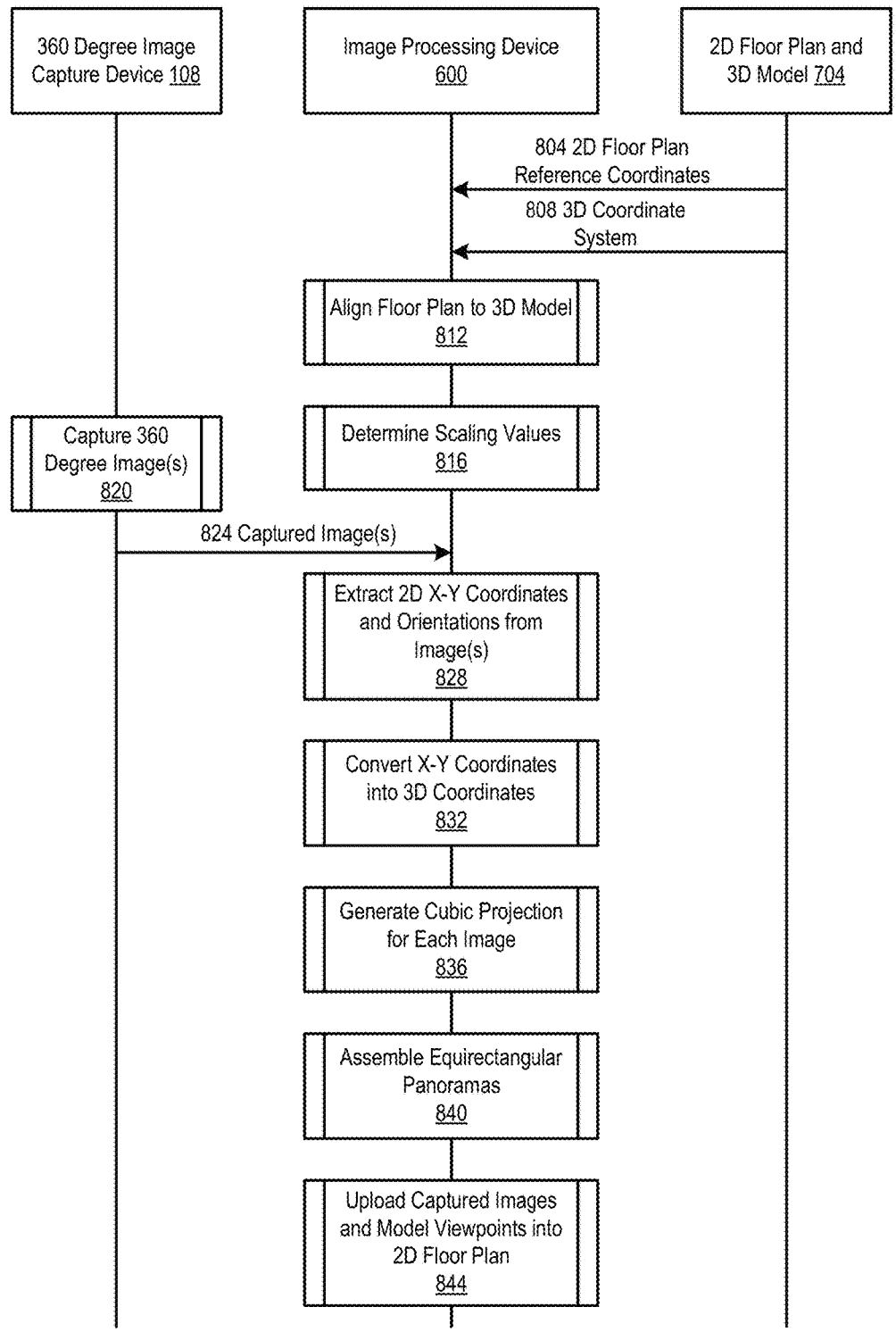

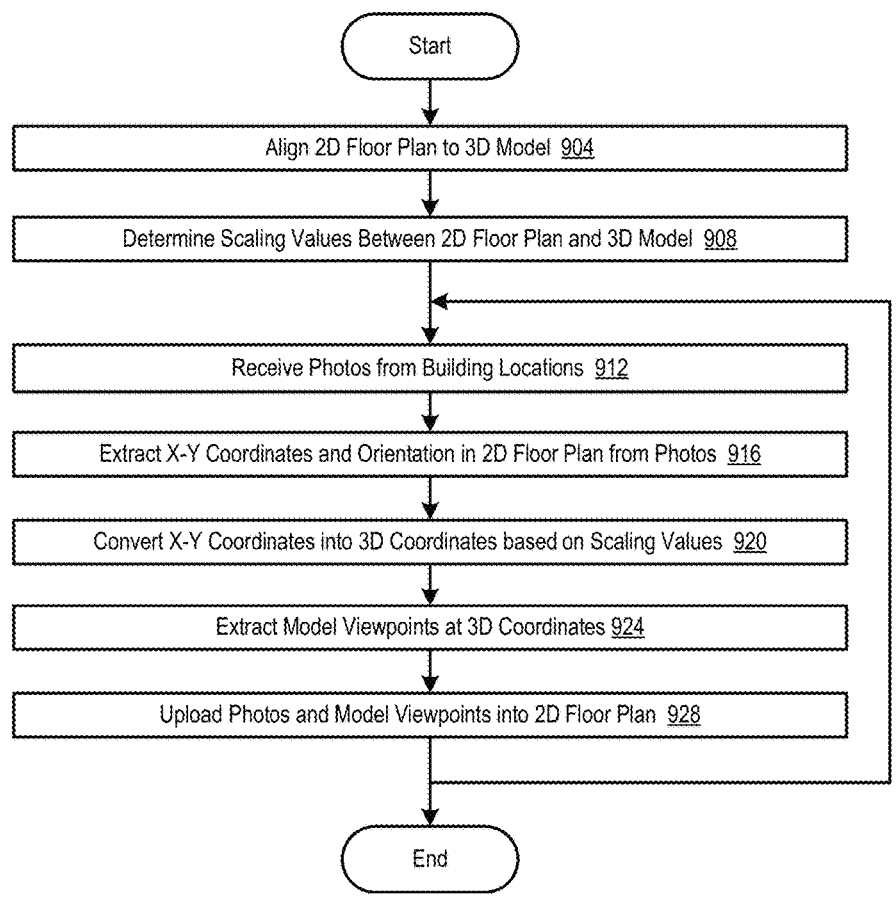
Fig. 9 Photo Transfer Process to 2D Floor Plan Using Non-360 Degree Camera

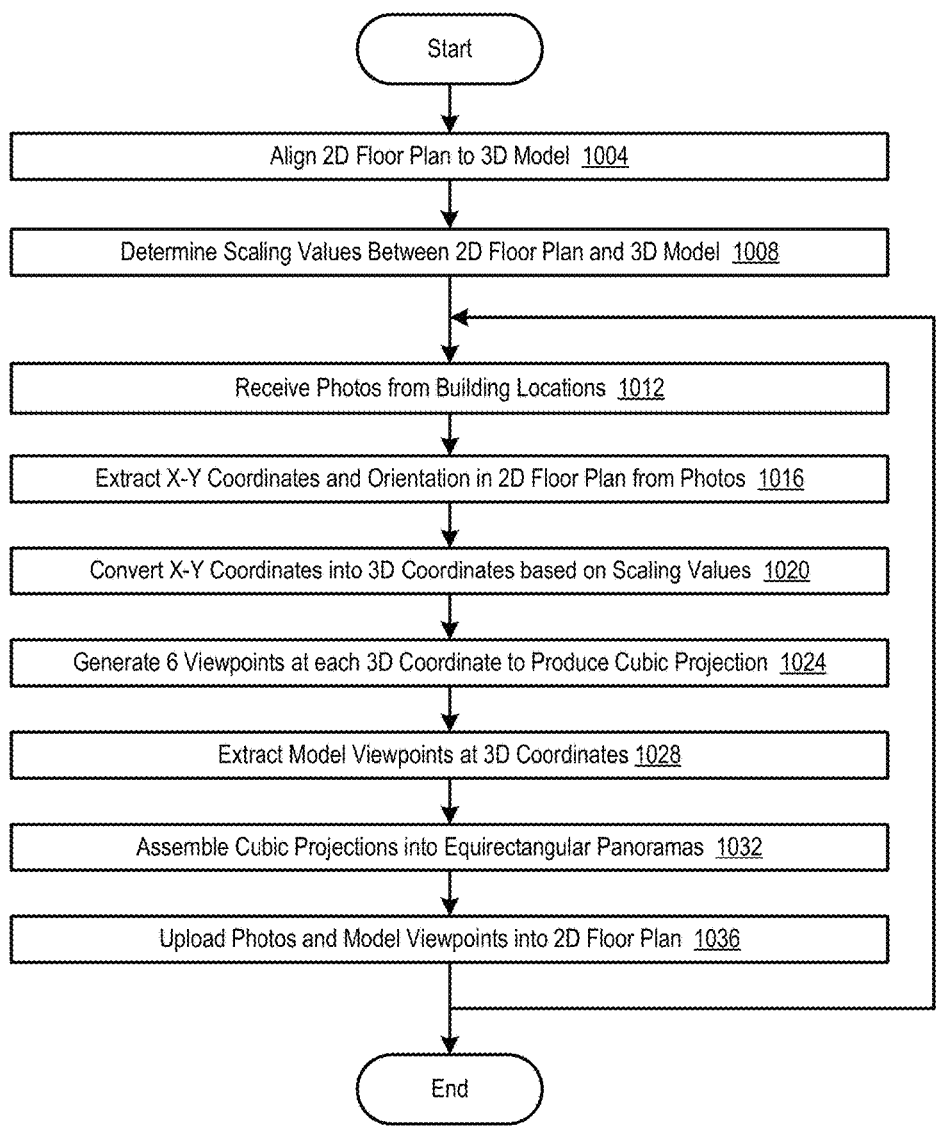
Fig. 10 Photo Transfer Process to 2D Floor Plan Using 360 Degree Camera

*Fig. 11 Photo and 3D Model Image integration on 2D Floor Plan*
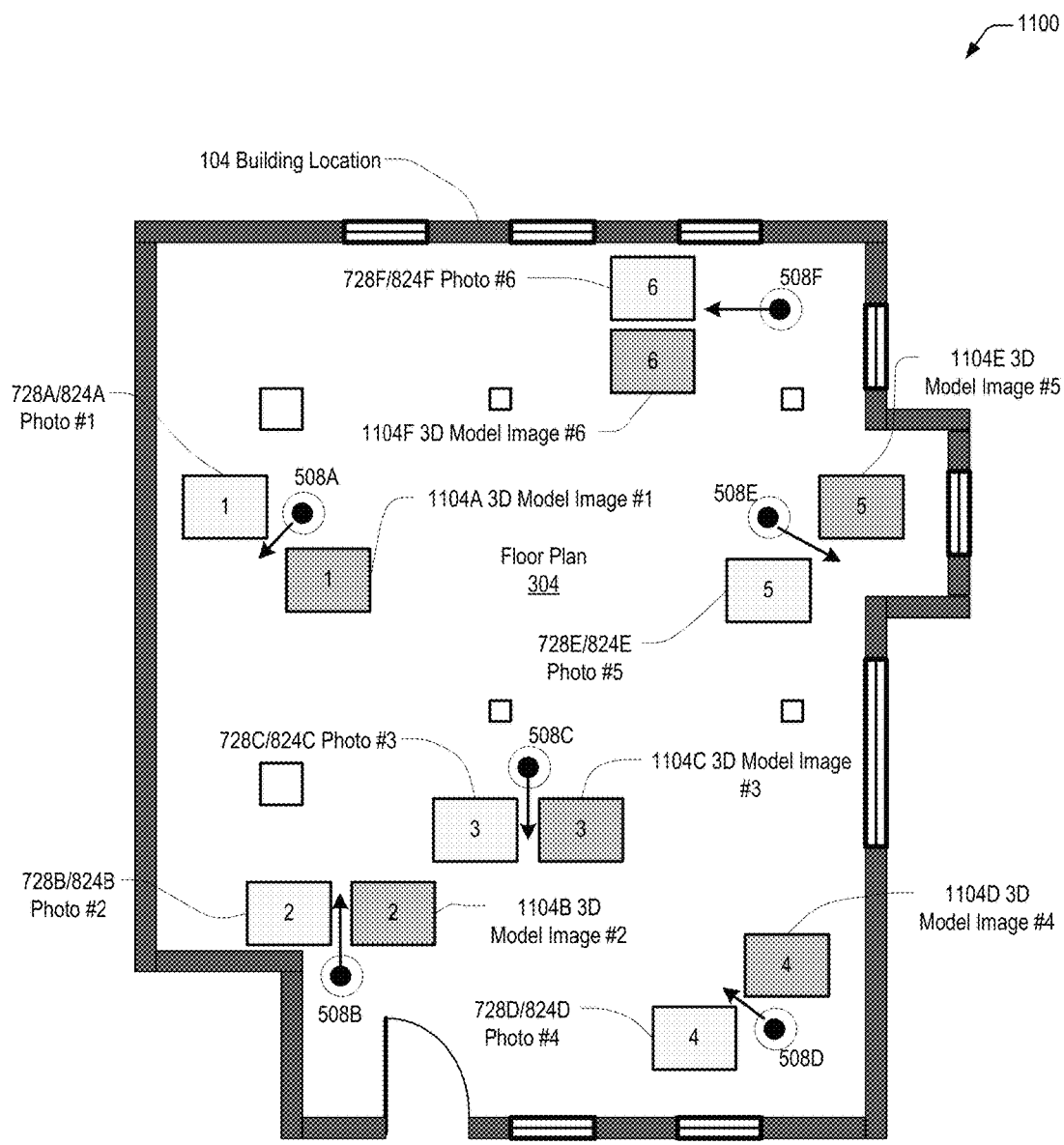

Fig. 12  Photo and 3D Model Image Comparison
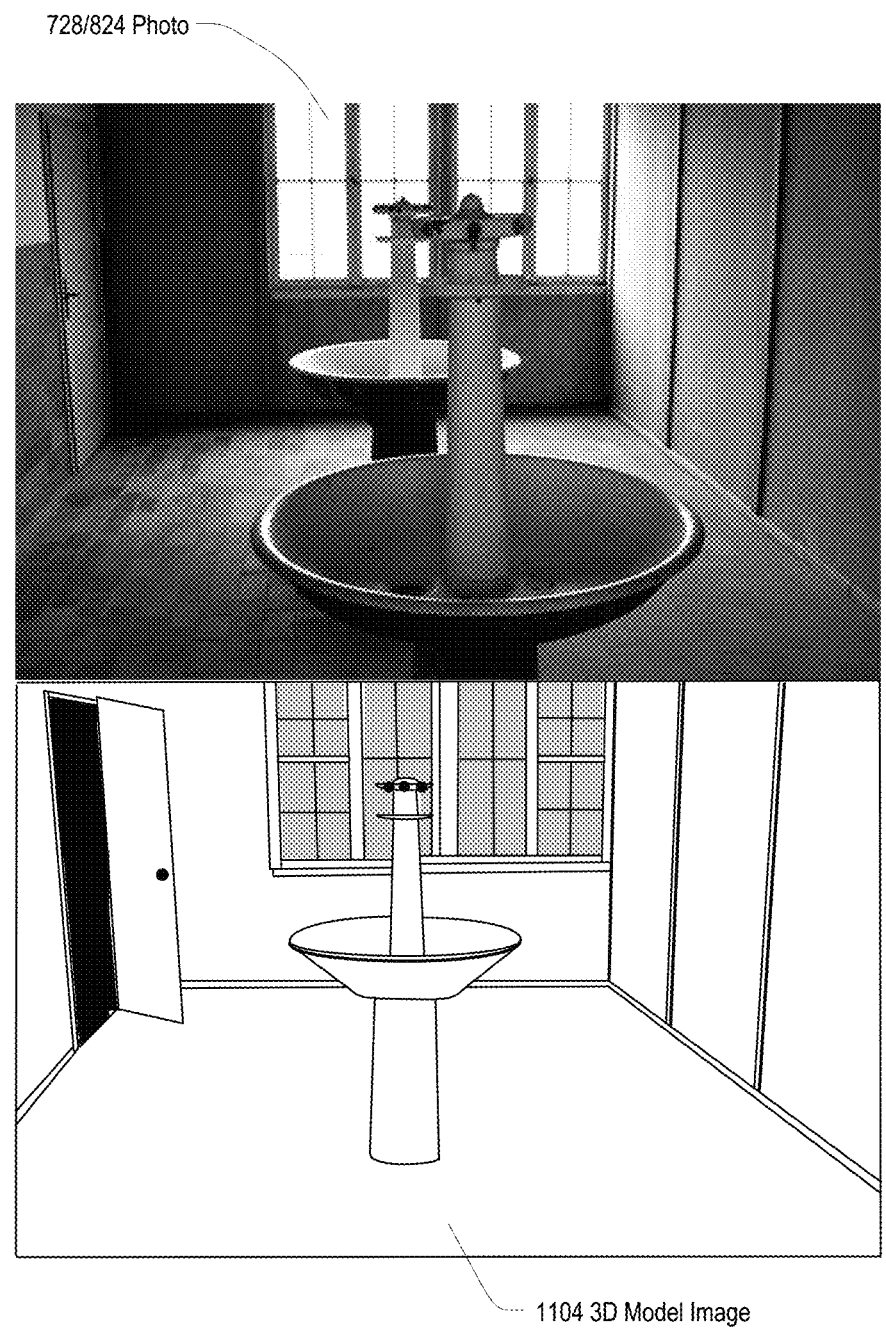

Fig. 13 Photo and 3D Model Image Comparison
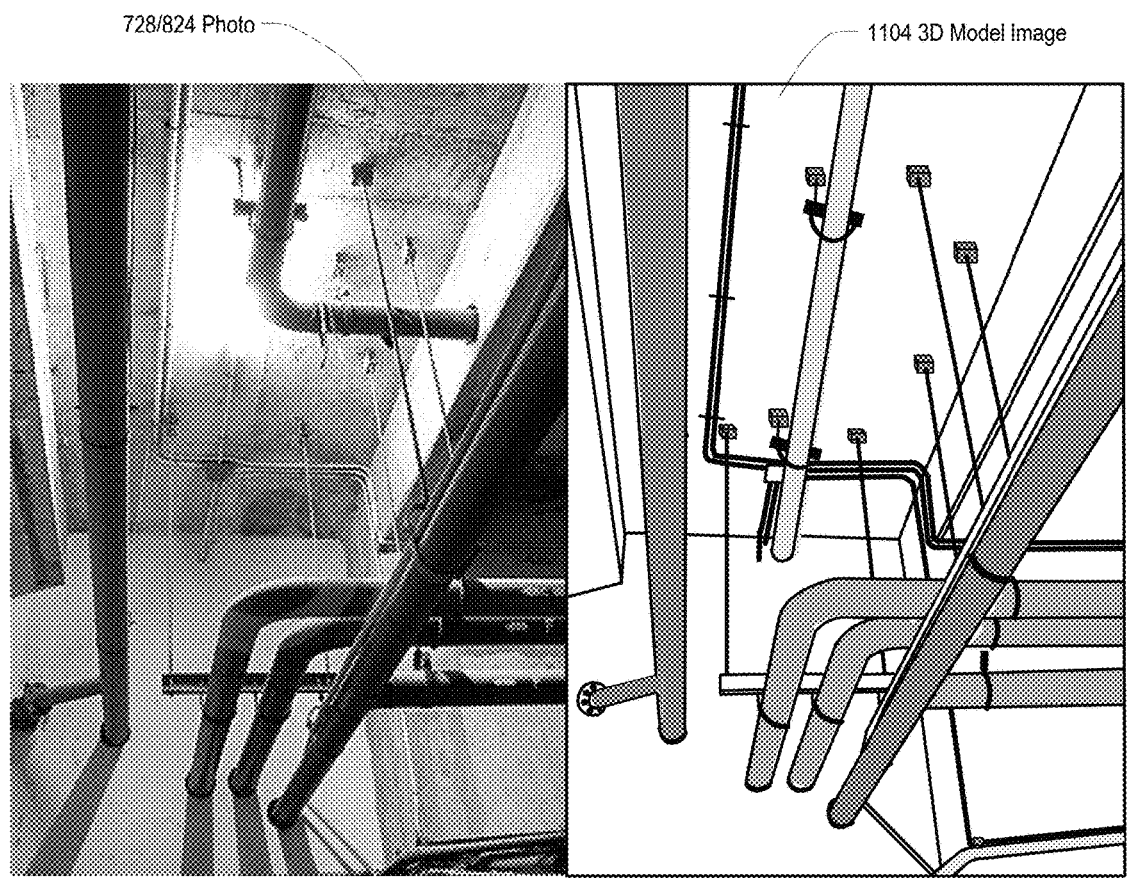

CONSTRUCTION PHOTOGRAPH INTEGRATION WITH 3D MODEL IMAGES

CROSS REFERENCE TO RELATED APPLICATION(S)

This application claims priority to earlier filed provisional application No. 62/627,450 filed Feb. 7, 2018 and entitled "LOCATION AND ORIENTATION-BASED GENERATION OF 3D MODEL VIEWS FROM CONSTRUCTION PHOTOGRAPHS", the entire contents of which are hereby incorporated by reference.

FIELD

The present invention is directed to methods and systems for conventional and panoramic imaging for building sites, and more specifically integration of construction photographs with 3D model images in building environments.

BACKGROUND 360 degree images, also known as immersive images or spherical images, are images where a view in every direction is recorded at the same time, shot using an omnidirectional camera or a collection of cameras. During photo viewing on normal flat displays, the viewer has control of the viewing direction and field of view. It can also be played on displays or projectors arranged in a cylinder or some part of a sphere. 360 degree photos are typically recorded using either a special rig of multiple cameras, or using a dedicated camera that contains multiple camera lenses embedded into the device, and filming overlapping angles simultaneously. Through a method known as photo stitching, this separate footage is merged into one spherical photographic piece, and the color and contrast of each shot is calibrated to be consistent with the others. This process is done either by the camera itself, or using specialized photo editing software that can analyze common visuals and audio to synchronize and link the different camera feeds together. Generally, the only area that cannot be viewed is the view toward the camera support.

360 degree images are typically formatted in an equirectangular projection. There have also been handheld dual lens cameras such as Ricoh Theta V, Samsung Gear 360, Garmin VIRB 360, and the Kogeto Dot 360—a panoramic camera lens accessory developed for the iPhone 4, 4S, and Samsung Galaxy Nexus.

360 degree images are typically viewed via personal computers, mobile devices such as smartphones, or dedicated head-mounted displays. Users may pan around the video by clicking and dragging. On smartphones, internal sensors such as gyroscopes may also be used to pan the video based on the orientation of the mobile device. Taking advantage of this behavior, stereoscope-style enclosures for smartphones (such as Google Cardboard viewers and the Samsung Gear VR) can be used to view 360 degree images in an immersive format similar to virtual reality. A smartphone display may be viewed through lenses contained within the enclosure, as opposed to virtual reality headsets that contain their own dedicated displays.

SUMMARY

The present invention is directed to solving disadvantages of the prior art. In accordance with embodiments of the present invention, a method is provided. The method includes one or more of receiving, by an image processing device, one or more photos of building locations at a building, extracting position coordinates comprising X and Y values in a 2D floor plan from the one or more photos, converting the position coordinates into 3D model coordinates, extracting model viewpoints from a 3D model of the building at the 3D model coordinates, and comparing each of the one or more photos with a corresponding model viewpoint. Each of the model viewpoints provides a view of the 3D model at a same viewing position as one of the one or more photos.

In accordance with another embodiment of the present invention, a system is provided. The system includes one or more of an image capture device, configured to capture one or more photos of building locations at a building and an image processing device. The image processing device includes a display, a memory, and a processor, coupled to the display and the memory. The memory includes an application, a 2D floor plan of the building, and a 3D model of the building. The processor is configured to execute the one or more applications to receive the one or more photos from the image capture device, extract position coordinates comprising X and Y values in the 2D floor plan from the one or more photos, convert the position coordinates into 3D model coordinates, extract model viewpoints from the 3D model at the 3D model coordinates, and compare each of the one or more photos with a model viewpoint that corresponds to each of the one or more photos. Each of the model viewpoints provides a view of the 3D model at a same viewing position as one of the one or more photos.

In accordance with yet another embodiment of the present invention, a non-transitory computer readable storage medium is provided. The non-transitory computer readable storage medium is configured to store instructions that when executed cause a processor to perform one or more of receiving, by an image processing device, one or more photos of building locations at a building, extracting position coordinates comprising X and Y values in a 2D floor plan from the one or more photos, converting the position coordinates into 3D model coordinates, extracting model viewpoints from a 3D model of the building at the 3D model coordinates, and comparing each of the one or more photos with a corresponding model viewpoint. Each of the model viewpoints provides a view of the 3D model at a same viewing position as one of the one or more photos.

One advantage of the present invention is that it provides methods and systems for visually annotating a 2D building floor plan. Increasingly, 2D floor plans are software files displayed on computers that allow additional information (i.e. annotation) to be added in order to facilitate management of construction processes. The present application provides visual information to be annotated at specific coordinates within a floor plan of a building. The visual information includes a photo taken at a specific time and a corresponding model viewpoint from a 3D model of the building that shows how the building should appear. By comparing the visual information, a user may be able to determine if the building construction is being properly performed (i.e. per drawings or per building codes), if a construction schedule is being met, or if construction operations are being performed in the proper order.

Another advantage of the present invention is that it provides methods and systems for monitoring new building construction, building redesign, or building remodel. Any sort of change to building interior, building exterior, building property, or building aesthetics may be monitored. The changes may include, but is not limited to, any combination of building materials, electrical, plumbing, landscaping, HVAC, mechanical, doors or windows, access, security, environmental, privacy, decoration, or paint/surface treatments.

Another advantage of the present invention is that it allows either a conventional (non-360 degree) or a 360 degree camera or image capture device to be used. Conventional image capture devices are now ubiquitous, and allow the option of an untrained individual to capture a series of construction photographs. On the other hand, 360 degree image capture devices allow a more trained individual to capture a series of 360 degree images, which provide more visual information than conventional photographs.

Additional features and advantages of embodiments of the present invention will become more readily apparent from the following description, particularly when taken together with the accompanying drawings. This overview is provided to introduce a selection of concepts in a simplified form that are further described below in the detailed description. It may be understood that this overview is not intended to identify key features or essential features of the claimed subject matter, nor is it intended to be used to limit the scope of the claimed subject matter.

BRIEF DESCRIPTION OF THE DRAWINGS

FIG. 1 is a diagram illustrating elements of a building location image capture system in accordance with embodiments of the present invention.

FIG. 2 is a diagram illustrating camera view orientation in accordance with embodiments of the present invention.

FIG. 3 is a diagram illustrating a building floor plan with specified common points in accordance with embodiments of the present invention.

FIG. 4 is a diagram illustrating a building 3D model with a self-contained coordinate system in accordance with embodiments of the present invention.

FIG. 5 is a diagram illustrating photo locations on a 2D floor plan in accordance with embodiments of the present invention.

FIG. 6 is a block diagram illustrating an image processing device in accordance with embodiments of the present invention.

FIG. 7 is a flow diagram illustrating non-panoramic image transfer in accordance with embodiments of the present invention.

FIG. 8 is a flow diagram illustrating panoramic image transfer in accordance with embodiments of the present invention.

FIG. 9 is a flowchart illustrating a photo transfer process to a 2D floor plan using a non-360 degree camera in accordance with embodiments of the present invention.

FIG. 10 is a flowchart illustrating a photo transfer process to a 2D floor plan using a 360 degree camera in accordance with embodiments of the present invention.

FIG. 11 is a diagram illustrating photo and 3D model image integration on a 2D floor plan in accordance with embodiments of the present invention.

FIG. 12 is a diagram illustrating photo and 3D model image comparison in accordance with embodiments of the present invention.

FIG. 13 is a diagram illustrating photo and 3D model image comparison in accordance with embodiments of the present invention.

DETAILED DESCRIPTION

The present invention utilizes various technologies to allow for the creation of annotations on building floor plans. The annotations are images at specific locations that correspond to coordinates where photographs are captured by either conventional or 360 degree image capture devices. The annotations allow for quick comparisons between the photographs and corresponding model viewpoints in 3D models of the same building where the photographs were captured. These comparisons may be performed anywhere and not necessarily in proximity to the building.

Prior to the present application, people needing to monitor building construction would generally walk around the building and take note of current construction compared to building construction plans at the building location or building site. In some cases, this might require an individual to carry some or all of paper construction plans to various points in the building in order to make an informed comparison. Such comparisons were inherently "local" by nature and required the individual with construction expertise (construction manager, foreman, supervisor, building inspector, etc) to be physically on-site in order to conduct the review and analysis.

Increasingly, the modern world is "paperless" and various forms of computers and computer networks interoperate to obtain data, store data, analyze data, and communicate data. The data may be text, graphics, video, audio, or any combination of data from any data sources. The present application describes methods and systems to perform universal (i.e. from literally anywhere, by any number of people) construction monitoring and management. This eliminates the requirements for many construction experts to be physically on-site frequently, which potentially may reduce construction costs and also allows construction problems to be identified and alleviated more quickly than conventional processes.

Referring now to FIG. 1, a diagram illustrating elements of a building location image capture system 100 in accordance with embodiments of the present invention is shown. FIG. 1 illustrates an interior building location 104 that is a construction site in the preferred embodiment. A construction site may include a building location 104 in a state of redesign, remodel, assembly, or construction—using various types, quantities, and locations of building materials, tools, construction refuse or debris, and so forth. Construction workers or other personnel may or may not be present. FIG. 1 illustrates a representative partially-completed interior building location 104, with various tools, building refuse, and building materials scattered or arranged within. The building location 104 also includes an actual hole 128 in the floor at the construction site, which will be referenced later as an example of a permanent construction detail that is compared with a 3D model.

The building location image capture system 100 may include one or more non-360 degree image capture devices 116 and/or one or more 360 degree image capture devices 108. Non-360 degree image capture devices 116 include phones or tablets that include a camera or digital cameras with a given field of view that is less than 360 degrees. In one embodiment, 360 degree image capture devices 108 include 360 degree cameras. In another embodiment, 360 degree image capture devices 108 include 360 degree laser scanners with photo export capability.

The non-360 degree image capture devices 116 or 360 degree image capture devices 108 capture photos at one or more image capture device positions 124 associated with a building. For example, the specific location 116 may be identified by a latitude, longitude, and height from a floor or ceiling. Once positioned at the one or more image capture device positions 124, a conventional photo 120 or 360 degree image 112 is captured by the non-360 degree image capture devices 116 or 360 degree image capture devices 108, respectively. In one embodiment, the captured non-360 degree images 120 or captured 360 degree images 112 are stored as a file in a memory device of the non-360 degree image capture devices 116 or 360 degree image capture devices 108, such as an SD Card or USB memory. In another embodiment, the non-360 degree image capture devices 116 or 360 degree image capture devices 108 include a wired or wireless interface that transfers the captured non-360 degree images 120 or captured 360 degree images 112 to another location such as a server or mobile device 400 serving as an image processing device 600. In yet another embodiment, the non-360 degree image capture devices 116 or 360 degree image capture devices 108 include a wired or wireless interface that transfers the captured non-360 degree images 120 or captured 360 degree images 112 to cloud storage or another storage medium, and sent to or retrieved by the image processing device 600.

A single image 112, 120 or multiple images 112, 120 may be captured, and may be captured at different positions 124 and/or with different orientations, zoom levels, or other viewing properties. A given set of images 112, 120 may include images from both non-360 degree image capture devices 116 and 360 degree image capture devices 108. A given set of images 112, 120 may include images captured at different times, and one or more images may include timestamps when the corresponding images were captured. Time stamps may include a date and/or a time during a day and may be displayed as text within the image or stored as metadata accompanying the image data.

Positions 124 may be captured by various means, including but not limited to receiving user inputs designating position coordinates, determining position coordinates that use one or more of global positioning system coordinates, wireless connection coordinates, compass inputs, accelerometer inputs, or gyroscope inputs, receiving computer vision inputs that designate position coordinates, and receiving photogrammetry inputs that designate position coordinates.

Although the building location 104 is represented throughout the drawings herein as a non-panoramic image for simplicity and ease of understanding, it should be understood that captured 360 degree images 112 are true 360-degree images with image content at all 360 degrees around the 360 degree image capture device 108 position (i.e. all 360 degrees of yaw 236 as shown in FIG. 2).

Referring now to FIG. 2, a diagram illustrating camera view orientation in accordance with embodiments of the present invention is shown. FIG. 2 illustrates various camera orientations relative to x, y, and z dimensions. The x dimension may be viewed as left 216 to right 212. The y dimension may be viewed as up 220 to down 224. The z dimension may be viewed as front 204 to rear 208. Note, however, that camera positions (X, Y, Z) relative to a 2D floor plan 300 are different than shown in FIG. 2, and are explained in more detail with respect to FIG. 3.

Each dimension may also have a rotation about one of the three axes (x, y, and z). A rotation around the x dimension (left-right axis) is pitch 232, and from a camera position at the center of the diagram is viewed as up or down motion. A rotation around the y dimension (up-down axis) is yaw 236, and from a camera position at the center of the diagram is viewed as left or right motion. A rotation around the z dimension (front-rear axis) is roll 228, and from a camera position at the center of the diagram is viewed as tilting left or right motion.

When specifying a specific camera or image capture device 108, 116 view, it is important to specify several parameters. First, the image capture device position 124 (used for both non-360 and 360 degree device) specifies a specific position in proximity to the building location 104 (see FIG. 3). The specific position 124 includes at least an X and a Y value, and may be an interior or exterior position. Orientation indicates a specific pointing direction and device 108, 116 orientation in 3-dimensional space. In some embodiments, an orientation of one or more of a roll 228, a pitch 232, or a yaw 236 value may be provided by a user, the capture device itself 108, 116, or determined by other means. In some embodiments, only a yaw 236 value is provided (i.e. rotation), and roll 228 and pitch 232 values are assumed to be 0. As long as the image capture device 108, 116 is maintained in an untilted (no roll 228) attitude, only pitch 232 and yaw 236 values need to be specified. In some embodiments, a gyroscopic device may provide any required roll 228, pitch 232, or yaw 236 values.

One other parameter may need to be provided in order to fully specify a camera view: field of view. The camera or other image capture device 108, 116 has a lens which may or may not be adjustable. The field of view is a standard measurement (i.e. a 360 field of view of a 360 degree image capture device 108, a 90 degree field of view from a non-360 degree image capture device 116, etc.).

Referring now to FIG. 3, a diagram illustrating a building floor plan 300 with specified common points in accordance with embodiments of the present invention is shown. FIG. 3 illustrates a 2D floor plan 300 for a building location 104 as shown in FIG. 1. The building floor plan 300 views part of a building location (i.e. a floor) from a top-down viewing perspective, and shows walls, windows, a doorway, and permanent structural columns. Any specific location associated with the floor plan 300 (i.e. a camera viewing location) has both an X and a Y coordinate. The X coordinate corresponds to a left-right position on the viewed page, and the Y coordinate corresponds to a top-bottom position on the viewed page. Thus, and X-Y coordinate pair specifies a specific position on the viewed page, or a specific position on the 2D floor plan 300.

Although a camera position in most embodiments has a height coordinate (Z coordinate) as well as X and Y coordinates, on a 2D floor plan 300 only the X and Y coordinates are required since the Z coordinate is masked and does not change or affect the X or Y coordinates. In most embodiments, the Z coordinate (if specified) is the height above the floor of 2D floor plan 300 and building location 104 being viewed. In some embodiments, if a Z coordinate is not specified it is assumed to be at a fixed level. In one embodiment, the fixed level is a common eye level above the floor, for example 5.5-6.0 feet.

At least two common points are specified in both the 2D floor plan 300 and a 3D model 400, in order to align the 2D floor plan 300 with the 3D model 400. The common points are points in space that represent the exact same position in both the 2D floor plan 300 and the 3D model 400. In most embodiments, it is preferable to choose the common points so that any potential specific location where a photo may be taken (i.e. a camera position) is within the X and Y coordinates specified by the common points.

In the example of FIG. 3, a first coordinate 304 (i.e. first common point) having an X-Y coordinate pair of (0,0) is assigned outside the walls of building location 104 so that all interior building location positions to the left and bottom parts of the 2D floor plan 300 may be used as potential camera positions. However, in other embodiments a more restrictive first coordinate 304 may be selected in order to exclude portions of building location 104 as potential camera positions 316.

For the second common point, in one embodiment a second coordinate 308 having an X-Y coordinate pair of (1,1) may be assigned outside the walls of building location 104 so that all interior building location positions to the top and right parts of the 2D floor plan 300 may be used as potential camera positions. In some embodiments, a third coordinate 312 having an X-Y coordinate pair of (0.5,0.5) may be specified in order to provide a third common point. In the example of FIG. 3, the third coordinate 312 is positioned exactly in the middle of the first coordinate 304 and the second coordinate 308. However, in other embodiments, a third coordinate 312 may be positioned differently with respect to the first coordinate 304 and the second coordinate 308. By assigning X-Y coordinates of (0,0) for the first coordinate 304 and (1,1) for the second coordinate 308, any potential camera position within building location 104 will have an X coordinate between 0 and 1 and a Y coordinate between 0 and 1 (or an X-Y coordinate between (0,0) and (1,1)). With at least the first and second common points defined, there is now a coordinate system established for the 2D floor plan 300.

Within the defined 2D coordinate system (i.e. between (0,0) and (1,1)), one or more individuals may capture photos at one or more specific camera positions 316. Each of these camera positions 316 has at least an X and a Y value. Optionally, one or more of these camera positions 316 may also have a corresponding orientation 320. The camera orientation 320 may include any combination of roll 228, pitch 232, and yaw 236 values. For cases where only a yaw 236 value is provided, the roll 228 and pitch 232 values may be assumed to be zero.

Referring now to FIG. 4, a diagram illustrating a diagram illustrating a building 3D model with a self-contained coordinate system in accordance with embodiments of the present invention is shown. FIG. 4 shows an exemplary 3D model 400 of a building location 104 having the same view as shown in FIG. 1. The 3D model 400 may represent the building location 104 at any user-selected stage of construction. 3D models 400 inherently have their own coordinate system 404 (3D model coordinates), where any selected point has an X, Y, and Z coordinate. For example, the same point in the 3D model 400 corresponding to camera position 316 and camera orientation 320 in the 2D model 300 may be 3D model camera position and orientation coordinates 408. This position 408 may have different X, Y and Z coordinates (identified as X', Y', and Z') than camera position 316 since the 3D model coordinate system 404 is different than the 2D model 300 coordinate system. However, the roll 228, pitch 232, and yaw 236 values may be the same between the 2D floor plan 300 and the 3D model 400.

With the coordinate systems of both the 2D floor plan 300 and the 3D model 400 now established, and the common points defined, scaling values are now defined between the 2D floor plan 300 and the 3D model 400. Scaling values include an X coordinate scaling value and a Y coordinate scaling value, and allow (X',Y') 3D model coordinates 408 to be determined based on 2D floor plan coordinates 316, 508. One recommended algorithm that can be used to align model coordinates to be aligned to 2D floor plan coordinates 316, 508 is the following:

From docs.google.com
1. TRANSFORM common coordinates of DRAWING COORDINATES to match common coordinates of MODEL COORDINATES
2. ROTATE set of points of DRAWING COORDINATE in order to match set of points of MODEL COORDINATES
   a. First find the angular measurement between MODEL COORDINATES and DRAWING COORDINATE's set of points
   b. Use the angle to apply transformation on all points on DRAWING COORDINATES
   c. SCALE DRAWING COORDINATES so that set points of raw match set of points of MODEL COORDINATES
2. Find distance between set of points of MODEL COORDINATES, and separately of DRAWING COORDINATES
3. Find the multiplication factor, and multiply to raw to match MODEL COORDINATES
   d. Match origin points—Match the coordinates of the 2D floorplan to the model via a common origin point by taking the X value of
   e. Match scale—
   f. Match rotation—

For each of the photo locations 316 shown in FIG. 3 or photo locations 508 shown in FIG. 5, the processes of the present application extract model viewpoints from the 3D model 400 at the same locations. The model viewpoints are analogous to photos, except they are taken from the 3D model 400 instead of captured non-360 degree images 116 or captured 360 degree images 112. By analogous, the model viewpoints share the same viewing location, orientation (and possibly zoom and field of view) as the photos or images 112, 120.

FIG. 4 also shows a planned hole in a floor in the 3D model 412, which may be compared to the actual hole in the floor at the construction site 128 (i.e. in a photograph). This type of comparison may be useful, for example, to determine if the hole 128 is at the proper location or if the hole 128 was properly constructed. In general, it may be most helpful to view the 3D model 400 at a same, or nearly same, construction phase as reflected in the captured non-360 degree images 120 or captured 360 degree images 112. In one embodiment, timestamps captured with the images 112, 120 may determine the construction phase, and stored images 112, 120 may be retrieved in order to compare the state of construction at a specific phase with a 3D model image reflecting the same phase of construction.

Referring now to FIG. 5, a diagram illustrating photo locations on a 2D floor plan 300 in accordance with embodiments of the present invention is shown. FIG. 5 shows an example using six photos of a building location 104, and how the position and orientation parameters may be reflected with respect to the 2D floor plan 300.

Each photograph is taken at a location 508, in a direction 504. Each location 508 has a corresponding X-Y coordinate defined as $(X_{coord}, Y_{coord})$. Therefore, Photo 1 is taken at location 1 508A, in direction 1 504A, and at coordinates $(X_{coord1}, Y_{coord1})$, Photo 2 is taken at location 2 508B, in direction 2 504B, and at coordinates $(X_{coord2}, Y_{coord2})$, Photo 3 is taken at location 3 508C, in direction 3 504C, and at coordinates $(X_{coord3}, Y_{coord3})$, Photo 4 is taken at location 4 508D, in direction 4 504D, and at coordinates $(X_{coord4}, Y_{coord4})$, Photo 5 is taken at location 5 508E, in direction 5 504E, and at coordinates $(X_{coord5}, Y_{coord5})$, and Photo 6 is taken at location 6 508F, in direction 6 504F, and at coordinates $(X_{coord6}, Y_{coord6})$. Any number of photographs may be taken, in any combination of 360 and non-360 degree photos. As long as the locations 508 of photos are within the common points between the 2D floor plan 300 and 3D model 400 (i.e. within the coordinate system), the photos may be mapped between the 2D floor plan 300 and the 3D model 400.

The position coordinates (locations 316, 508) may be determined or extracted from the captured non-360 degree images 120 or captured 360 degree images 112 by several different methods: (1) receiving user inputs designating the position coordinates 316, 508, (2) determining position coordinates using one or more of global positioning system coordinates, wireless connection coordinates, compass inputs, accelerometer inputs, or a gyroscope input, (3) receiving computer vision inputs designating position coordinates, and (4) receiving photogrammetry inputs designating position coordinates.

Referring now to FIG. 6, a block diagram illustrating an image processing device 600 in accordance with embodiments of the present invention is shown. The image processing device 600 may be any type of computing device including a server, a desktop computer, smart phone, a tablet, a pad computer, a laptop computer, a notebook computer, a wearable computer such as a watch, or any other type of computer.

The image processing device 600 includes one or more processors 604, which run an operating system and one or more applications 616, and control operation of the image processing device 600. The processor 604 may include any type of processor known in the art, including embedded CPUs, RISC CPUs, Intel or Apple-compatible CPUs, and may include any combination of hardware and software. Processor 604 may include several devices including field-programmable gate arrays (FPGAs), memory controllers, North Bridge devices, and/or South Bridge devices. Although in most embodiments, processor 604 fetches application 616 program instructions and metadata 612 from memory 608, it should be understood that processor 604 and applications 616 may be configured in any allowable hardware/software configuration, including pure hardware configurations implemented in ASIC or FPGA forms.

The display 628 may include control and non-control areas. In some embodiments, controls are "soft controls" shown on the display 628 and not necessarily hardware controls or buttons on image processing device 600. In other embodiments, controls may be all hardware controls or buttons or a mix of "soft controls" and hardware controls. Controls may include a keyboard 624, or a keyboard 624 may be separate from the display 628. The display 628 displays photos, video, snapshots, drawings, text, icons, and bitmaps.

Image processing device 600 includes memory 608, which may include one or both of volatile and nonvolatile memory types. In some embodiments, the memory 608 includes firmware which includes program instructions that processor 604 fetches and executes, including program instructions for the processes disclosed herein. Examples of non-volatile memory 608 include, but are not limited to, flash memory, SD, Erasable Programmable Read Only Memory (EPROM), Electrically Erasable Programmable Read Only Memory (EEPROM), hard disks, and Non-Volatile Read-Only Memory (NOVRAM). Volatile memory 608 stores various data structures and user data. Examples of volatile memory 608 include, but are not limited to, Static Random Access Memory (SRAM), Dual Data Rate Random Access Memory (DDR RAM), Dual Data Rate 2 Random Access Memory (DDR2 RAM), Dual Data Rate 3 Random Access Memory (DDR3 RAM), Zero Capacitor Random Access Memory (Z-RAM), Twin-Transistor Random Access Memory (TTRAM), Asynchronous Random Access Memory (A-RAM), ETA Random Access Memory (ETA RAM), and other forms of temporary memory.

In addition to metadata 612 and one or more application(s) 616, memory 608 may also include one or more captured images 112, 120, including captured images 112, 120 received from non-360 degree image capture devices 116 and/or 360 degree image capture devices 108. Metadata 612 may include various data structures in support of the operating system and applications 616, such as timestamps associates with captured images 112, 120 or position/orientation data as described with reference to the figures herein. Applications 616 may include one or more 2D floor plan applications and one or more 3D model programs. In addition to creating or displaying 2D floor plans 300 and 3D models 400, these applications 616 may allow various annotation data to be added—including photos, model viewpoints, position information, or orientation information—or links to such information.

Image processing device 600 also includes one or more communication interfaces 620, which is any wired or wireless interface 644 able to connect to networks or clouds—including the internet, in order to transmit and receive captured non-360 degree 120 or captured 360 degree 112 images, 2D floor plans 300, or 3D models 400.

In some embodiments, image processing device 600 may optionally include a camera 632, which produces a live camera image 648 or captures photographs used by one or more applications 616 and shown on display 628. A camera 632 may be either a 360 degree or panoramic camera 108, or a non-panoramic device 116. In some embodiments, the image processing device 600 includes both a front camera 632A as well as a rear camera 632B as well as a means to switch the camera image 648 between the front camera 632A and the rear camera 632B. In other embodiments, the image processing device 600 does not itself include a camera 632, but is able to interface with a separate camera through various means known in the art. In some embodiments, the image processing device 600 is the same physical device as either the non-360 degree image capture device 116 or the 360 degree image capture device 108.

In some embodiments, the image processing device 600 may include a location tracking receiver 636, which may interface with GPS satellites in orbit around the earth or indoor positioning systems to determine accurate location of the image processing device 600. The location tracking receiver 636 produces location coordinates 640 used by an operating system or application 616 to determine, record, and possibly display the image processing device 600 position or location.

Referring now to FIG. 7, a flow diagram illustrating non-panoramic image transfer in accordance with embodiments of the present invention is shown. FIG. 7 shows the process flow between a non-360 degree image capture device 116, an image processing device 600, and a 2D floor plan and 3D model 704.

The image processing device 600 first receives 2D floor plan reference coordinates 708 from a 2D floor plan 300 and a 3D coordinate system 712 from a 3D model 400. The 2D floor plan 300 and 3D model 400 are of the same building. Once the image processing device 600 receives both the 2D floor plan reference coordinates 708 and the 3D coordinate system 712, it aligns the floor plan to the 3D model 716. As described with reference to FIG. 3, two or more common points are selected between the 2D floor plan 300 and the 3D model 400, where the common points have the same specific X-Y locations. At this point, a given common point would have different coordinates in the 2D floor plan 300 and the 3D model 400. After the common points have been specified, normalized coordinates are assigned in the 2D floor plan (e.g. a coordinate of (0,0) for a first coordinate 304 and a coordinate of (1,1) for a second coordinate 308).

Because the 3D model 400 has an existing coordinate system, existing coordinates exist for the common points. Therefore, with common point coordinates now known between the 2D floor plan 300 and the 3D model 400, the image processing device 600 determines scaling values 720 in order to map any point in the 2D floor plan 300 to the same point in the 3D model 400. At this point, the image processing system 600 is able to process either non-360 degree or 360 degree images.

At block 724, the non-360 degree image capture device 116 captures one or more non-360 degree images. In one embodiment, non-360 degree images 724 are transferred one at a time as captured images 728. In another embodiment, a batch of non-360 degree images 724 (perhaps, but not necessarily as, a group of all of the current images of a building or building floor) are transferred in a group as captured images 728.

The image processing device 600 then extracts 2D X-Y coordinates and orientations from the received image or images 728. At this point, the captured images 728 will each have at least an X-Y coordinate and orientation in the 2D floor plan 300. In some embodiments, each captured image 728 may also have a zoom parameter, a field of view parameter, and/or a height parameter (Z coordinate) as well.

Once the 2D coordinates and orientations have been determined 732, the X-Y coordinates are converted into 3D model coordinates 736. To do this, the scaling factors determined in block 720 are applied to the 2D X-Y coordinates from block 732. With the 3D model coordinates 736, model viewpoints are extracted at each of the 3D coordinate locations 740. To do this, the 3D model coordinates are entered into the 3D model application—resulting in an image or viewpoint at those coordinates. A same orientation (roll 228, pitch 232, yaw 236) used in the 2D floor plan 300 or the captured images 728 are applied to the 3D model viewpoints 740. This then results in a same number of model viewpoints 740 as captured images 728—with the same position relative to the building and orientation.

Next, the captured images and model viewpoints are uploaded to the 2D floor plan 744 at the corresponding 2D X-Y coordinates. This allows a construction expert or person of knowledge to compare, at each location, a current photograph (captured image 728) with a model viewpoint 740. A visual determination can then be made of the current state of construction or remodel (captured image 728) compared to how it should appear (3D model viewpoint 740). As differences are identified, notifications may be created to relevant parties or corrective actions initiated.

Referring now to FIG. 8, a flow diagram illustrating panoramic image transfer in accordance with embodiments of the present invention is shown. FIG. 7 shows the process flow between a 360 degree image capture device 108, an image processing device 600, and a 2D floor plan and 3D model 704.

The image processing device 600 first receives 2D floor plan reference coordinates 804 from a 2D floor plan 300 and a 3D coordinate system 808 from a 3D model 400. The 2D floor plan 300 and 3D model 400 are of the same building. Once the image processing device 600 receives both the 2D floor plan reference coordinates 804 and the 3D coordinate system 808, it aligns the floor plan to the 3D model 812. As described with reference to FIG. 3, two or more common points are selected between the 2D floor plan 300 and the 3D model 400, where the common points have the same specific X-Y locations. At this point, a given common point would have different coordinates in the 2D floor plan 300 and the 3D model 400. After the common points have been specified, normalized coordinates are assigned in the 2D floor plan (e.g. a coordinate of (0,0) for a first coordinate 304 and a coordinate of (1,1) for a second coordinate 308).

Because the 3D model has an existing coordinate system, existing coordinates exist for the common points. Therefore, with common point coordinates now known between the 2D floor plan 300 and the 3D model 400, the image processing device 600 determines scaling values 816 in order to map any point in the 2D floor plan 300 to the same point in the 3D model 400. At this point, the image processing system 600 is able to process either non-360 degree or 360 degree images.

At block 820, the 360 degree image capture device 108 captures one or more panoramic or 360 degree images. In one embodiment, 360 degree images 820 are transferred one at a time as captured images 824. In another embodiment, a batch of 360 degree images 820 (perhaps, but not necessarily as, a group of all of the current images of a building or building floor) are transferred in a group as captured images 824.

The image processing device 600 then extracts 2D X-Y coordinates and orientations from the received image or images 824. At this point, the captured images 824 will each have at least an X-Y coordinate and orientation in the 2D floor plan 300. In some embodiments, each captured image 824 may also have a zoom parameter, a field of view parameter, and/or a height parameter (Z coordinate) as well.

Once the 2D coordinates and orientations have been determined 828, the X-Y coordinates are converted into 3D model coordinates 832. To do this, the scaling factors determined in block 816 are applied to the 2D X-Y coordinates from block 828. With the 3D model coordinates 832 now determined, and because the images are panoramic or 360 degree images, a cubic projection is generated 836 for each 360 degree image. Six model viewpoints are generated at each 3D coordinate in order to produce a cubic projection. Each of the 6 model viewpoints may have a 90 degree field of view, and these may be stitched together into a single, full 360 panoramic/equirectangular image. This step may be optional if there are alternative ways to directly create a single equirectangular image (with a full 360 degree field of view).

Next, equirectangular panoramas are assembled 840. An equirectangular panorama is a single image that contains the information required for standard 360 photo viewing software to view an area in full 360 degrees; it contains imagery in every direction. An equirectangular panorama is the main and most common format that 360 cameras produce and is used by most current mainstream software. It is critical to have the images turned into this format, and the method of producing this can be somewhat challenging.

The captured images 824 and equirectangular panoramas 844 are uploaded to the 2D floor plan 848 at the corresponding 2D X-Y coordinates. This allows a construction expert or person of knowledge to compare, at each location, a current panoramic image (captured image 824) with an equirectangular panorama 844. A visual determination can then be made of the current state of construction or remodel (captured image 824) compared to how it should appear (equirectangular panorama 844). As differences are identified, notifications may be created to relevant parties or corrective actions initiated.

Referring now to FIG. 9, a flowchart illustrating a photo transfer process to a 2D floor plan 300 using a non-360 degree camera 116 in accordance with embodiments of the present invention is shown. FIG. 9 illustrates a process to use one or more non-360 degree cameras 116 to update a building floor plan 300. Flow begins at block 904.

At block 904, a 2D floor plan 300 of the building is aligned to a 3D model 400 of the building. The purpose of alignment is to map a collection of common points between the 2D floor plan 300 and 3D model 400 in order to provide a common basis for determining scaling. Flow proceeds to block 908.

At block 908, scaling values are determined between the 2D floor plan 300 and the 3D model 400. The purpose of determining scaling values is to map any coordinate of the building between the 2D floor plan 300 and 3D model 400 in order to determine coordinates in either system. Flow proceeds to block 912.

At block 912, non-360 degree photos or images 120 are received from building locations. Any number of photos may be received, and they may be processed individually or as a group. Flow proceeds to block 916.

At block 916, X-Y coordinates are extracted from the received photos, in a 2D floor plan 300 of the building. In some embodiments, some form of orientation (i.e. roll 228, pitch 232, and/or yaw 236) may be extracted as well. Flow proceeds to block 920.

At block 920, the extracted X-Y coordinates are converted into 3D coordinates, based on the scaling values from block 908. Flow proceeds to block 924.

At block 924, model viewpoints are extracted at each of the 3D coordinates. One model viewpoint is extracted from the 3D model 400 for each received photo from block 912. Flow proceeds to block 928.

At block 928, photos from block 912 and model viewpoints from block 924 are uploaded to the 2D floor plan 300. Thus, at every photo location in the 2D floor plan 300, the photo taken at that location as well as a model viewpoint from the 3D model 400 at that location is displayed on the 2D floor plan 300. In one embodiment, images of the photos and model viewpoints are displayed. In another embodiment, links to the photos and/or model viewpoints are displayed. This may advantageously take up less space of the 2D floor plan 300 than images. Flow ends at block 928, and returns to block 912 to check for additional or newly received photos.

Referring now to FIG. 10, a flowchart illustrating a photo transfer process to a 2D floor plan 300 using a 360 degree camera 108 in accordance with embodiments of the present invention is shown. FIG. 10 illustrates a process to use one or more panoramic or 360 degree cameras 108 to update a building floor plan 300. Flow begins at block 1004.

At block 1004, a 2D floor plan 300 of the building is aligned to a 3D model 400 of the building. The purpose of alignment is to map a collection of common points between the 2D floor plan 300 and 3D model 400 in order to provide a common basis for determining scaling. Flow proceeds to block 1008.

At block 1008, scaling values are determined between the 2D floor plan 300 and the 3D model 400. The purpose of determining scaling values is to map any coordinate of the building between the 2D floor plan 300 and 3D model 400 in order to determine coordinates in either system. Flow proceeds to block 1012.

At block 1012, 360 degree photos 112 are received from building locations. Any number of photos may be received, and they may be processed individually or as a group. Flow proceeds to block 1016.

At block 1016, X-Y coordinates are extracted from the received photos, in a 2D floor plan 300 of the building. In some embodiments, some form of orientation (i.e. roll 228, pitch 232, and/or yaw 236) may be extracted as well. Flow proceeds to block 1020.

At block 1020, the extracted X-Y coordinates are converted into 3D coordinates 408, based on the scaling values from block 1008. Flow proceeds to block 1024.

At block 1024, six model viewpoints are generated at each 3D coordinate in order to produce a cubic projection. Flow proceeds to block 1028.

At block 1028, model viewpoints are extracted at each of the 3D coordinates. Six model viewpoints are extracted from the 3D model 400 for each received 360 degree photo from block 1012. Flow proceeds to block 1032.

At block 1032, the cubic projections from block 1024 are assembled into an equirectangular panorama. Flow proceeds to block 1036.

At block 1036, photos from block 1012 and model viewpoints from block 1028 are uploaded to the 2D floor plan 300. Thus, at every photo location in the 2D floor plan 300, the photo taken at that location as well as a model viewpoint from the 3D model 400 at that location is displayed on the 2D floor plan 300. In one embodiment, images of the photos and model viewpoints are displayed. In another embodiment, links to the photos and/or model viewpoints are displayed. This may advantageously take up less space of the 2D floor plan 300 than images. Flow ends at block 1036, and returns to block 1012 to check for additional or newly received photos Referring now to FIG. 11, a diagram illustrating photo and 3D model image integration to a 2D floor plan 1100 in accordance with embodiments of the present invention is shown. FIG. 11 shows how the 2D floor plan 300 is modified by adding images of the building and 3D model viewpoints at each of the photo coordinates in the floor plan.

In the example of FIG. 11, there are six photo locations 508 shown, identified as locations 508A-508F. Each location has a corresponding coordinate in the 2D floor plan 300 as well as an orientation (shown as a yaw 236 value arrow pointing in a specific direction indicating a direction the photo was taken. Although six photo locations 508 are shown, there may be any number of such locations, and a given building may have a same or different number of photo locations 508 on each floor or sub-building location.

At each photo location 508, there are two images shown that are associated with the location 508. The first image is either a captured non-360 degree image 728 or a captured 360 degree image 824. The first images are images 728A/824A (Photo #1) taken at position 508A, 728B/824B (Photo #2) taken at position 508B, 728C/824C (Photo #3) taken at position 508C, 728D/824D (Photo #4) taken at position 508D, 728E/824E (Photo #5) taken at position 508E, and 728F/824F (Photo #6) taken at position 508F. The second images are 3D model images or 3D model viewpoints 1104, shown as 3D model image #1 1104A at position 508A, 3D model image #2 1104B at position 508B, 3D model image #3 1104C at position 508C, 3D model image #4 1104D at position 508D, 3D model image #5 1104E at position 508E, and 3D model image #6 1104F at position 508F. Alternatively, one or more links to image content may be provided on the 2D floor plan 300 instead of actual images 728/824/1104 in order to reduce display clutter and aid in readability.

From this example, it may readily be seen that integrating such information on a common schematic (2D floor plan 300) aids in rapid understanding of the current status of construction or revisions to buildings. Identifying differences between the current state of construction and modeled images provides those with detailed knowledge or various stakeholders current information on both the state and the quality of construction. By identifying such differences rapidly, simple differences or errors may be corrected or planned for, and expensive and elaborate mistakes may be avoided.

The various views and illustration of components provided in the figures are representative of exemplary systems, environments, and methodologies for performing novel aspects of the disclosure. For example, those skilled in the art will understand and appreciate that a component could alternatively be represented as a group of interrelated sub-components attached through various temporarily or permanently configured means. Moreover, not all components illustrated herein may be required for a novel embodiment, in some components illustrated may be present while others are not.

The descriptions and figures included herein depict specific embodiments to teach those skilled in the art how to make and use the best option. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

Finally, those skilled in the art should appreciate that they can readily use the disclosed conception and specific embodiments as a basis for designing or modifying other structures for carrying out the same purposes of the present invention without departing from the spirit and scope of the invention as defined by the appended claims.

I claim:

1. A method comprising:
   receiving, by an image processing device, one or more photos of building locations at a building;
   extracting position coordinates comprising X and Y values in a 2D floor plan from the one or more photos;
   converting the position coordinates into 3D model coordinates;
   extracting model viewpoints from a 3D model of the building at the 3D model coordinates, each of the model viewpoints providing a view of the 3D model at a same viewing position and orientation as one of the one or more photos; and
   comparing each of the one or more photos with a corresponding model viewpoint,
   wherein the one or more photos are 360 degree images produced by a 360 degree image capture device, wherein in response to converting the position coordinates into 3D model coordinates, the method further comprising:
      generating six 3D model viewpoints at each of the 3D model coordinates;
      producing a cubic projection based on the six 3D model viewpoints; and
      assembling the cubic projection into an equirectangular panorama.

2. The method of claim 1, further comprising:
   aligning the 2D floor plan of the building to the 3D model; and
   determining scaling values between the 2D floor plan and the 3D model.

3. The method of claim 2, wherein aligning the 2D floor plan of the building to the 3D model comprising:
   specifying two or more common points between the 2D floor plan and the 3D model,
   wherein determining scaling values between the 2D floor plan and the 3D model comprising:
      mapping position coordinate values at each of the two or more common points between the 2D floor plan and the 3D model; and
      deriving the scaling values from the mapped coordinate values in order to convert an input coordinate value in the 2D floor plan into an output coordinate value in the 3D model.

4. The method of claim 1, wherein extracting position coordinates from the one or more photos comprising one or more of:
   receiving user inputs designating position coordinates;
   determining position coordinates using one or more of global positioning system coordinates, wireless connection coordinates, compass inputs, accelerometer inputs, or a gyroscope input;
   receiving computer vision inputs designating position coordinates; and
   receiving photogrammetry inputs designating position coordinates.

5. The method of claim 1, wherein extracting position coordinates comprising extracting one or more of a height value, a roll value, a yaw value, and a pitch value.

6. The method of claim 1, wherein comparing each of the one or more photos with a corresponding model viewpoint comprising:
   annotating the 2D floor plan at each of the position coordinates, wherein the annotation comprising one of a photo and a corresponding model viewpoint or a link to the photo and a link to the corresponding model viewpoint; and
   identifying one or more of similarities and differences between one or more photos and corresponding model viewpoints at one or more position coordinates.

7. A system, comprising:
   an image capture device, configured to capture one or more photos of building locations at a building; and
   an image processing device, comprising:
      a display;
      a memory, comprising:
         one or more applications;
         a 2D floor plan of the building; and
         a 3D model of the building; and
      a processor, coupled to the memory, the display, and configured to execute the one or more applications to:
         receive the one or more photos from the image capture device;
         extract position coordinates comprising X and Y values in the 2D floor plan from the one or more photos;
         convert the position coordinates into 3D model coordinates;
         extract model viewpoints from the 3D model at the 3D model coordinates, each of the model viewpoints provides a view of the 3D model at a same viewing position and orientation as one of the one or more photos; and compare each of the one or more photos with a model viewpoint that corresponds to each of the one or more photos,
wherein the one or more photos are 360 degree images produced by a 360 degree image capture device, wherein in response to the image processing device converts the position coordinates into 3D model coordinates, the image processing device if further configured to:
generate six 3D model viewpoints at each of the 3D model coordinates;
produce a cubic projection based on the six 3D model viewpoints; and
assemble the cubic projection into an equirectangular panorama.

8. The system of claim 7, wherein the image processing device is configured to:
align the 2D floor plan of the building to the 3D model; and
determine scaling values between the 2D floor plan and the 3D model.

9. The system of claim 8, wherein the image processing device aligns the 2D floor plan of the building to the 3D model comprises the image processing device further configured to:
specify two or more common points between the 2D floor plan and the 3D model,
wherein the image processing device determines scaling values between the 2D floor plan and the 3D model comprises the image processing device further configured to:
map position coordinate values at each of the two or more common points between the 2D floor plan and the 3D model; and
derive the scaling values from the mapped coordinate values in order to convert an input coordinate value in the 2D floor plan into an output coordinate value in the 3D model.

10. The system of claim 7, wherein the image processing device extracts position coordinates from the one or more photos comprises the image processing device further configured to one or more of:
receive user inputs designating position coordinates;
determine position coordinates that use one or more of global positioning system coordinates, wireless connection coordinates, compass inputs, accelerometer inputs, or gyroscope inputs;
receive computer vision inputs that designate position coordinates; and
receive photogrammetry inputs that designate position coordinates.

11. The system of claim 7, wherein the image processing device extracts position coordinates comprises the image processing device extracts one or more of a height value, a roll value, a yaw value, and a pitch value.

12. The system of claim 7, wherein the image processing device compares each of the one or more photos with a model viewpoint that corresponds to each of the one or more photos comprises the image processing device further configured to:
annotate the 2D floor plan at each of the position coordinates, wherein the annotation comprises one of a photo and a model viewpoint that corresponds to the photo or a link to the photo and a link to the model viewpoint that corresponds to the photo;
show the annotated 2D floor plan on the display; and
identify one or more of similarities and differences between one or more photos and model viewpoints at one or more position coordinates.

13. A non-transitory computer readable storage medium configured to store instructions that when executed cause a processor to perform:
receiving one or more photos of building locations at a building;
extracting position coordinates comprising X and Y values in a 2D floor plan from the one or more photos;
converting the position coordinates into 3D model coordinates;
extracting model viewpoints from a 3D model of the building at the 3D model coordinates, each of the model viewpoints providing a view of the 3D model at a same viewing position and orientation as one of the one or more photos; and
comparing each of the one or more photos with a corresponding model viewpoint,
wherein the one or more photos are 360 degree images produced by a 360 degree image capture device, wherein in response to converting the position coordinates into 3D model coordinates, the method further comprising:
generating six 3D model viewpoints at each of the 3D model coordinates;
producing a cubic projection based on the six 3D model viewpoints; and
assembling the cubic projection into an equirectangular panorama.

14. The non-transitory computer readable storage medium of claim 13, further comprising:
aligning the 2D floor plan of the building to the 3D model; and
determining scaling values between the 2D floor plan and the 3D model,
wherein aligning the 2D floor plan of the building to the 3D model comprising:
specifying two or more common points between the 2D floor plan and the 3D model,
wherein determining scaling values between the 2D floor plan and the 3D model comprising:
mapping position coordinate values at each of the two or more common points between the 2D floor plan and the 3D model; and
deriving the scaling values from the mapped coordinate values in order to convert an input coordinate value in the 2D floor plan into an output coordinate value in the 3D model.

15. The non-transitory computer readable storage medium of claim 13, wherein extracting position coordinates from the one or more photos comprising one or more of:
receiving user inputs designating position coordinates;
determining position coordinates using one or more of global positioning system coordinates, wireless connection coordinates, compass inputs, accelerometer inputs, or a gyroscope input;
receiving computer vision inputs designating position coordinates; and
receiving photogrammetry inputs designating position coordinates.

16. The non-transitory computer readable storage medium of claim 13, wherein extracting position coordinates comprising extracting one or more of a height value, a roll value, a yaw value, and a pitch value.

17. The non-transitory computer readable storage medium of claim 13, wherein comparing each of the one or more photos with a corresponding model viewpoint comprising:
    annotating the 2D floor plan at each of the position coordinates, wherein the annotation comprising one of a photo and a corresponding model viewpoint or a link to the photo and a link to the corresponding model viewpoint; and
    identifying one or more of similarities and differences between one or more photos and corresponding model viewpoints at one or more position coordinates.

\* \* \* \* \*